Figure 1:
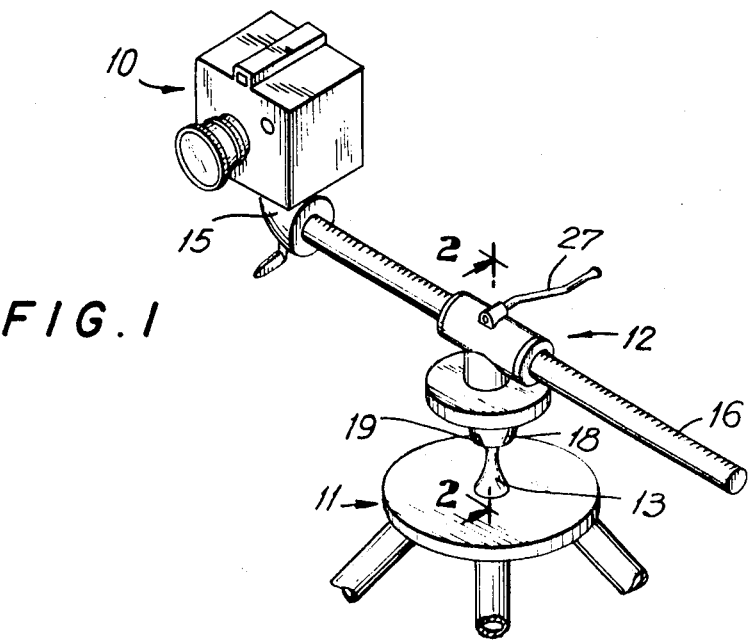

United States Patent

[11] 3,622,112

[72] Inventor George W. Stroh
 P.O. Box 906, Lancaster, Pa. 17604
[21] Appl. No. 878,778
[22] Filed Nov. 21, 1969
[45] Patented Nov. 23, 1971

[54] THREE AXES MOUNTING DEVICE
 7 Claims, 8 Drawing Figs.
[52] U.S. Cl. ................................................ 248/181,
 248/183
[51] Int. Cl. ...................................................... F16m 11/14
[50] Field of Search ............................................ 248/177,
 178, 179, 180, 181, 183, 184, 185, 186, 187, 121,
 122, 124; 95/86

[56] References Cited
 UNITED STATES PATENTS
2,670,228 10/1965 Pagliuso ........................ 248/181
2,956,764 10/1960 Nakatani ....................... 248/183
3,154,331 10/1964 Engelhardt .................... 248/124
3,211,405 10/1965 Fey et al. ...................... 248/181
 FOREIGN PATENTS
1,432,624 2/1966 France ......................... 248/183
1,006,254 4/1957 Germany ...................... 95/86
283,665 3/1931 Italy ............................. 248/181

Primary Examiner—Marion Parsons, Jr.
Attorney—Curtis, Morris & Safford

ABSTRACT: A mounting device for cameras and the like capable of positioning an object at a point about each of three axes substantially through a given point such as a ball or bar mount on a rigid base which comprises a first bearing means adapted to rotate about said given point and to frictionally bear against said given point, a support means for said object movably mounted on said first friction bearing means, second friction bearing means adapted to frictionally bear against said given point and against said support means, and locking means adapted to draw said support means and said first friction bearing means together, whereby said first and said second friction bearing means bear against said given point in a locking relation against rotation about said given point and said second friction bearing means bears against said support means in a locking relation.

INVENTOR.
GEORGE W. STROH

BY
Curtis, Morris & Safford
ATTORNEYS

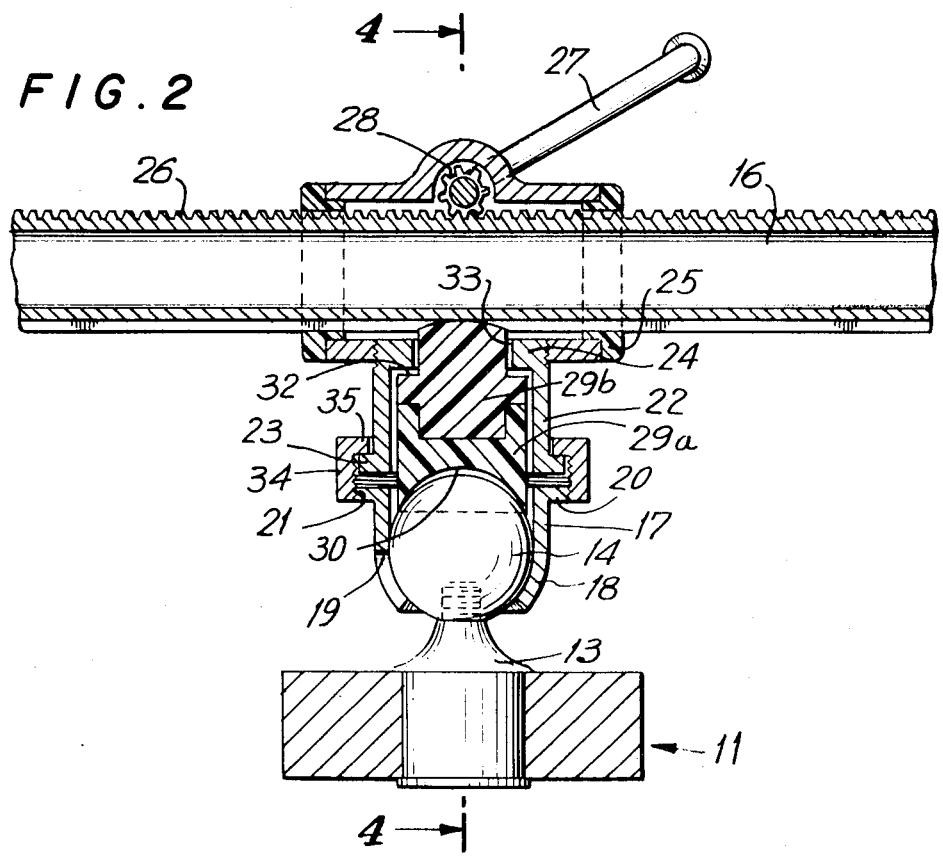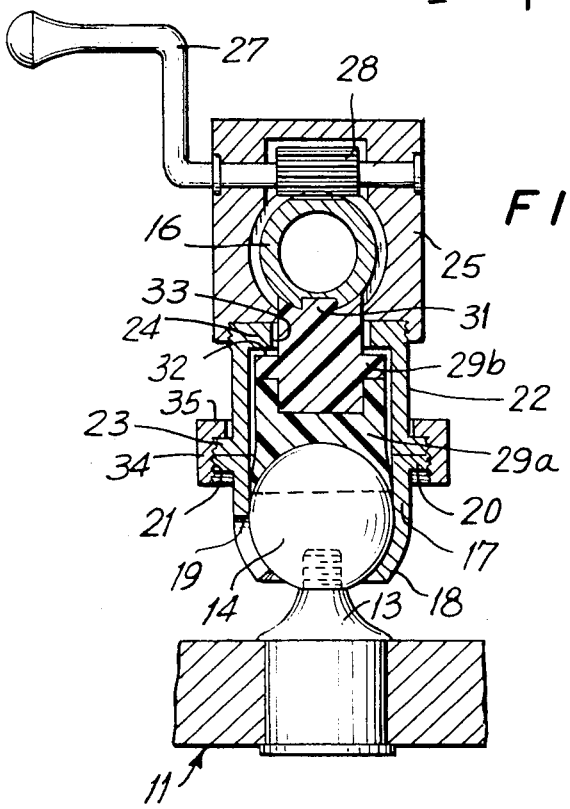

INVENTOR.
GEORGE W. STROH

BY
Curtis, Morris & Safford
ATTORNEYS

ABOUT3,622,112

THREE AXES MOUNTING DEVICE

This invention relates to a mounting device that permits three axes of movement each of which is lockable simultaneously by a single control, and more particularly to a mounting means especially suitable for cameras that enables a camera to be freely positioned at virtually any place within a sphere of movement and locked by a single locking means.

Many devices for mounting cameras on a rigid structure such as a tripod enable the camera to be moved about one, two or even three axes to obtain a desired view of a subject. Each such axis of movement usually has a locking or clamping means to hold the camera in position with respect to that axis. Difficulty is often experienced, however, in that each axis must manually be locked in sequence, usually with one hand while the other hand is used to steady the camera in position, and movement of the camera about the other axes is difficult to prevent, for example, while groping for each lock control. Similar difficulty is often encountered with other positioning devices, for example, mounting devices for the sensory elements of analytical instruments, lights and microphones.

It is an object of this invention to provide a mounting device that permits triaxial movement but has only a single locking control. Another object is to provide a mounting device that permits positioning at virtually any point within a sphere of movement and locking threat by means of a single control. A further specific object is to provide a mounting means for a camera on a rigid base such as a tripod that permits the camera to be positioned randomly with respect to a subject, and quickly and easily locked in position by a single manual operation. These and other objects will be in part explained and in part apparent in the following detailed disclosure of the invention.

Figure 4:
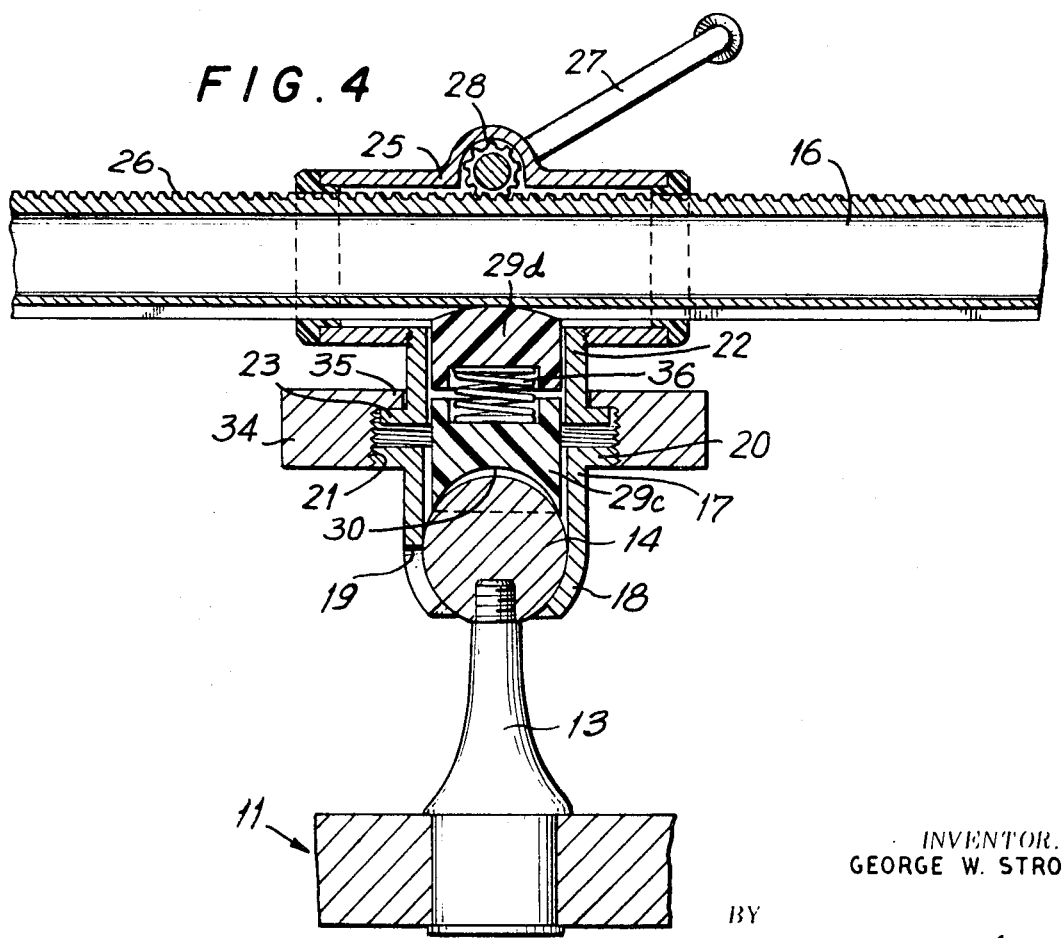
Figure 5:
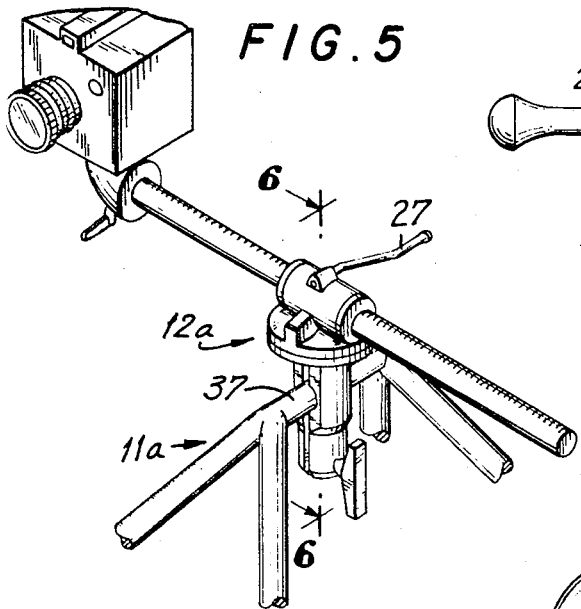
Figure 6:
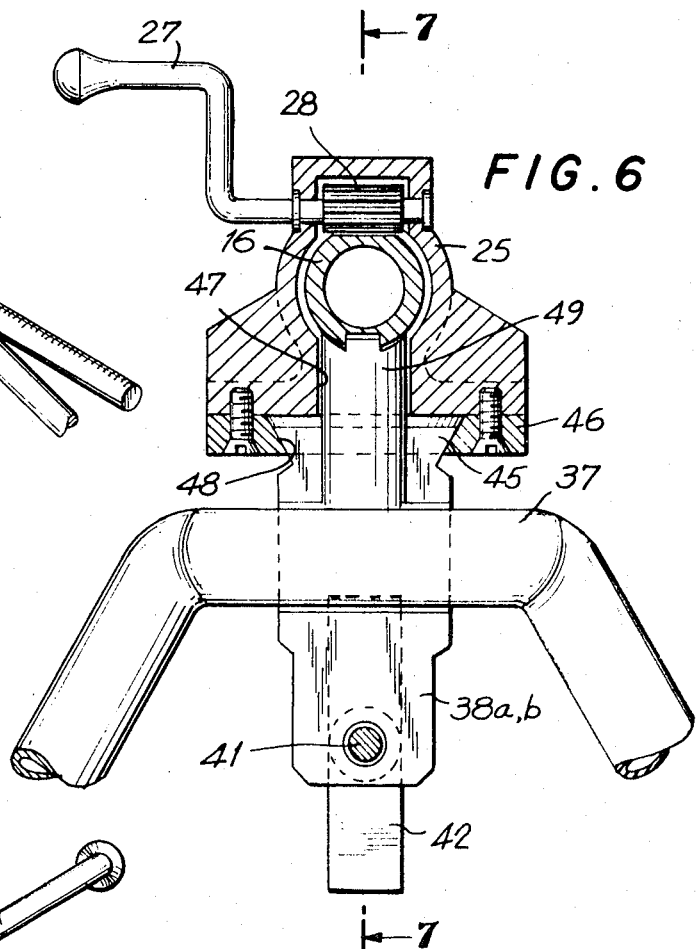
Figure 7:
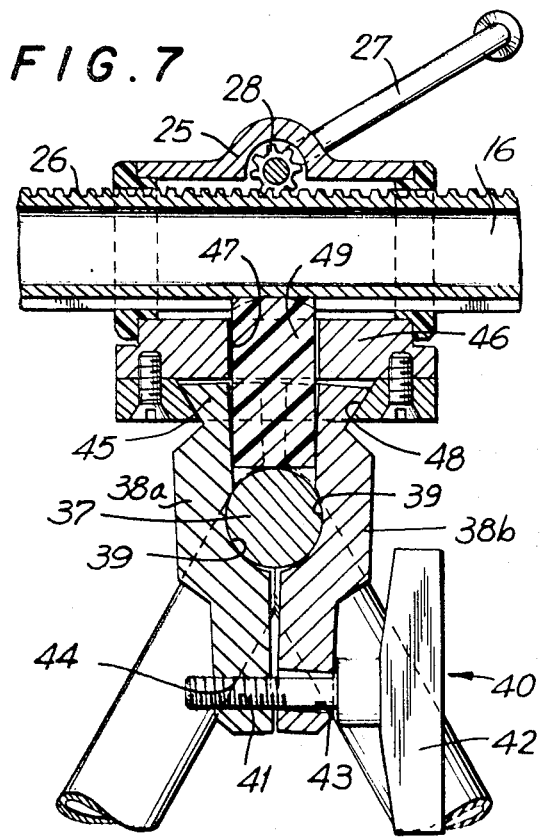

To aid in understanding the invention, reference will be made to the accompanying illustrative drawings in which:

FIGS. 1 and 5 are perspectives and show a camera mounted on a rigid supporting base by mounting devices of the invention; and FIGS. 2, 3, 4, 6, 7 and 8 are vertical sections and show the mechanical structure of the mounting devices of the invention.

FIG. 1 shows a camera 10 mounted on a rigid supporting base 11 by means of an embodiment of the subject mounting devices 12. The base 11 has a typical mounting post 13 topped by a ball 14 (FIGS. 2, 3 and 4) onto which the mounting device 12 is fastened. The ball mounting permits movement of the camera in the horizontal plane and vertically, that is, about three-axes, and thus to virtually any point on a sphere substantially about the ball. The camera 10 itself is supported by any suitable known clamping or screw means 15 to an extendible arm 16, and thus is moveable to virtually any position within a sphere substantially about the ball defined by the extendible length of the arm.

FIGS. 2 and 3 show the structural elements of the device in greater detail. A tubular ball member 17 open at both ends is formed adjacent one end into a partly spherical configuration 18 that corresponds to the ball 14. A slot 19 axially cut at one side of ball member 17 passes over the post 13 and enables the mounting device to be pivoted a full 90° in a vertical plane. At the other end of the tubular ball member 17 is a flanged portion 20 the outer periphery of which is threaded 21. A tubular spacing member 22 open at both ends has a flange portion 23 at one end and a shoulder portion 24 at the other end. A collar 25 is fastened to the latter end of the spacing member 22. The collar 25 is adapted to receive and hold the arm shaft 16, which is extendible axially therethrough. As is typical of such shafts in camera mounting devices, the shaft 16 has a rack 26 cut along its length and the collar 25 has a crank 27 that drives a gear 28 engaging the rack 26 to move the shaft axially to a desired position. Spaced between the ball 14 and the shaft 16 are friction bearing members 29a, 29b. The member 29a has a concave portion 30 substantially corresponding to part of the surface of the ball 14. The member 29b has an extension 31 that forms a shoulder 32 and passes through the end of the spacing member 22 and a corresponding opening 33 in the collar 25 to the shaft 16. The friction bearing members 29a, 29b can be made of any hard or relatively hard material, but preferably are made of a substantially hard, stiffly resilient material such as a synthetic resin, for example, polyethylene, tetrafluoroethylene, nylon or the like. An internally threaded locking member 34, a collar having a flange 35, is spaced about the spacing member 22 and is adapted to engage the threads 21 of the tubular ball member 17. The outer surface of the collar 34 can be knurled for better gripping.

FIG. 2 illustrates the mounting device in the "unlocked" condition in which the camera can be moved about the ball and toward or away from it to position the camera as desired with respect to a subject. The camera quickly and easily can be locked in that position by turning the locking member 34. As the collar 34 is turned, its flange 35 bears against the shoulder 23 of the tubular spacing member 22 and its threads draw the spacing member 22 toward the tubular ball member 17. That movement forces the spherical portion 18 of the tubular ball member and the friction bearing member 29a against the ball 14, and the extension 31 of the friction bearing member 29b against the shaft 16, as illustrated in FIG. 3, to hold the camera against movement both about and along any axis.

It will be apparent that the friction bearing members 29a, 29b can be a unitary element. One reason for using the two, however, is that the member 29b that bears against the shaft 16 can be made of a material having less frictional resistance to movement of the shaft 16. Such an arrangement enables the camera to be locked first about the axes, but for the shaft to remain extendible subject to a slight bit more turning of the locking member 34.

In that latter regard, FIG. 4 illustrates another embodiment of the invention differing from the one previously described with respect to the friction bearing members. In this embodiment the bearing members 29c, 29d are biased apart by a spring means 36. The spring serves to keep the friction members against the ball 14 and the shaft 16 so that there is a continuous resistance to movement. That resistance is not sufficient to impair easy positioning of the camera, but does tend to prevent "flopping about" of the camera and inadvertent movement while locking the device. Ultimate locking can result from further pressure due to the two friction bearing members 29c, 29d abutting or from further compression of the spring means 36, as might be desired in designing the mounting means.

FIGS. 5, 6, 7 and 8 illustrate another embodiment of the invention. The mounting device 12a shown therein is adapted for use with a rigid base 11a having a bar 37 rather than a ball 14. Twin clamping members 38a, 38b each having a cylindrical recess 39 are spaced on opposite sides of the bar 37 to permit movement of the camera in a vertical plane normal to the bar. A locking member 40 having a threaded bolt 41 and a handle 42 passes through an opening 43 in one clamping member 38b and screws into a threaded opening 44 in the other 38a. Each clamping member has at the opposite end a truncated circular conic bearing portion 45. The shaft collar 25 is fastened to a plate 46 having a central opening 47 and a truncated circular conic recess 48 that corresponds to the conic bearing portions 45. The plate 46, and thus the collar, shaft and camera, is free to rotate in a horizontal plane and in a vertical plane parallel to the bar 37. A friction bearing member 49 is between the clamping members 38a, 38b and extends through a plate opening 47 to the shaft 16.

Having positioned the camera, it can be locked in place against movement about any of the axes by turning the locking member 40. The bearing members 38a, 38b pivot about the bar 37 causing the conic bearing portions 45 to engage the conic recess 48. Friction between the clamping member recesses 39 and the bar 37, and between the conic bearing portions 45 and conic recess 48, simultaneously builds up to prevent rotation in each of the three planes of movement. Additionally, the conic portions 45, 48 tend to draw the plate 46 toward the bar 37. The friction bearing member 49 thus exerts force against the bar 37 and the shaft 16 to lock the shaft against movement.

Figure 8:
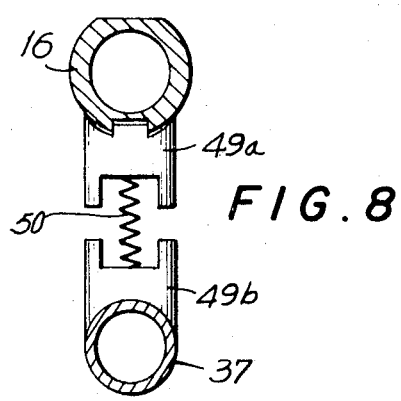

FIG. 8 shows another embodiment of the foregoing mounting device in which the friction bearing member 49 comprises two segments 49a, 49b each having a recess to retain a biasing means such as a spring 50. The biasing means 50 serves to maintain a continuous resistance to movement about the axes by keeping the friction bearing member 49a against the shaft 16 and the friction bearing member 49b against the bar 37. The advantage obtained is the same as described with regard to the embodiment shown in FIG. 4.

It will be apparent to persons skilled in the art that numerous changes can be made in the elements and structures described above in connection with the illustrative drawings without departing from the scope of the invention disclosed herein and defined in the appended claims.

I claim:

1. A mounting device capable of positioning an object at a point about each of three axes substantially through a given point of a base structure which comprises a first bearing means adapted to rotate about said given point and to frictionally bear against said given point, a support housing, a support shaft for said object journaled in said housing, second friction bearing means adapted to frictionally bear against said given point and against said support means within said housing, and locking means adapted to draw said support housing and said first friction bearing means together, whereby said first and said second friction bearing means bear against said given point in a locking relation against rotation about said given point and said friction bearing means bears against said support shaft within said support housing in a locking relation, said friction-bearing means being a plastic, said shaft having teeth across its periphery extending longitudinally, and said housing having a pinion gear on a crank arm to engage said teeth for moving said shaft through said housing.

2. A mounting device according to claim 1, wherein said given point is a ball means, said shaft has said teeth on one side only and has a longitudinal slot, and said second friction-bearing means has a protrusion which fits into said slot to prevent said shaft from rotating.

3. A mounting device according to claim 2 wherein said first friction bearing means has a portion corresponding to said ball means and a threaded portion, said support housing has means to engage said locking means, said second friction bearing means has a portion corresponding to said ball means, and said locking means has means to engage said support housing and a threaded portion adapted to engage said threaded portions of said first friction bearing means.

4. A mounting device according to claim 3 wherein said second friction bearing means comprises a first segment adapted to bear against said ball means, a second segment adapted to bear against said support shaft, and biasing means adapted to bias said first and said second segments against said ball means and said support shaft.

5. A mounting device according to claim 1, wherein said given point is a bar means, said shaft has said teeth on one side only and has a longitudinal slot, and said second friction-bearing means has a protrusion which fits into said slot to prevent said shaft from rotating.

6. A mounting device according to claim 5 wherein said first friction bearing means comprises two segments pivotally mounted on said bar means and first conic means, and said support housing has second conic means adapted to engage said first conic means.

7. A mounting device according to claim 6 wherein said second friction bearing means comprises a first segment adapted to bear against said bar means, a second segment adapted to bear against said support shaft, and biasing means adapted to bias said first and said second segments against said bar means and said support shaft.

* * * * *